(12) United States Patent
Houlihan

(10) Patent No.: US 12,533,564 B2
(45) Date of Patent: Jan. 27, 2026

(54) SPORTS TRAINING SYSTEM

(71) Applicant: Brian John Houlihan, Naperville, IL (US)

(72) Inventor: Brian John Houlihan, Naperville, IL (US)

( * ) Notice: Subject to any disclaimer, the term of this patent is extended or adjusted under 35 U.S.C. 154(b) by 65 days.

(21) Appl. No.: 18/506,306

(22) Filed: Nov. 10, 2023

(65) Prior Publication Data

US 2024/0261660 A1 Aug. 8, 2024

Related U.S. Application Data

(63) Continuation of application No. 16/920,980, filed on Jul. 6, 2020, now abandoned, which is a
(Continued)

(51) Int. Cl.
| | | |
|---|---|---|
| *A63B 71/06* | (2006.01) | |
| *A63B 24/00* | (2006.01) | |
| *A63B 43/00* | (2006.01) | |
| *A63B 67/14* | (2006.01) | |
| *A63B 69/00* | (2006.01) | |

(52) U.S. Cl.
CPC ...... *A63B 71/0622* (2013.01); *A63B 24/0021* (2013.01); *A63B 43/004* (2013.01); *A63B 67/14* (2013.01); *A63B 69/002* (2013.01); *A63B 69/0024* (2013.01); *A63B 71/0669* (2013.01); *A63B 2024/0028* (2013.01); *A63B 2071/0625* (2013.01); *A63B 2071/0658* (2013.01); *A63B 2220/40* (2013.01); *A63B 2220/833* (2013.01);
(Continued)

(58) Field of Classification Search
CPC ............ A63B 71/0622; A63B 71/0669; A63B 71/0625; A63B 71/0658; A63B 24/0021; A63B 43/004; A63B 67/14; A63B 69/002; A63B 69/0024; A63B 2225/74; A63B 2225/15; A63B 2225/50; A63B 2024/0028; A63B 2071/0625; A63B 2071/0658; A63B 2220/40; A63B 2220/833
See application file for complete search history.

(56) References Cited

U.S. PATENT DOCUMENTS

| | | | | |
|---|---|---|---|---|
| 11,501,521 B2* | 11/2022 | Kohler | ..................... | G06T 15/00 |
| 2006/0105857 A1* | 5/2006 | Stark | ...................... | A63B 43/00 |
| | | | | 473/353 |

(Continued)

*Primary Examiner* — Jeffrey K Wong
(74) *Attorney, Agent, or Firm* — Nolan Heimann LLP; Adam Diament

(57) ABSTRACT

A system for sports training comprising an object comprising one or more sensors that allows the system to identify the location of the object. The object also may have a microprocessor and wireless transmitter to allow for transmission of the sensor data via wireless transmission to an external electronic device. A software application running on the electronic device, such as a mobile phone or tablet, receives the sensor data and incorporates the information into a game-like or training application. This application can display to the user which location the object should be for the game. This application can also analyze which patterns the player has difficulties with and suggest certain patterns and other advice to help the player to improve their skills. Use of ultra-wideband communication between objects and base stations can determine the position of objects for use in training in hockey or soccer.

8 Claims, 15 Drawing Sheets

Related U.S. Application Data continuation-in-part of application No. 15/984,421, filed on May 21, 2018, now Pat. No. 10,722,773.

(52) U.S. Cl.
CPC ....... *A63B 2225/15* (2013.01); *A63B 2225/50* (2013.01); *A63B 2225/74* (2020.08)

(56) References Cited

U.S. PATENT DOCUMENTS

| | | | | |
|---|---|---|---|---|
| 2011/0230274 A1* | 9/2011 | Lafortune | .......... | A63B 71/0669 473/217 |
| 2012/0196706 A1* | 8/2012 | Poon | ...................... | A63B 43/00 473/415 |
| 2013/0029790 A1* | 1/2013 | Clark | ................ | A63B 71/0669 473/409 |
| 2015/0072811 A1* | 3/2015 | Jolliffe | ............... | G09B 19/0038 473/570 |
| 2018/0338288 A1* | 11/2018 | Tomasik | ........... | H04W 52/0212 |
| 2019/0242989 A1* | 8/2019 | Lee | ....................... | H04W 4/029 |
| 2019/0299073 A1* | 10/2019 | Vollbrecht | ............. | G06V 20/52 |

\* cited by examiner

SPORTS TRAINING SYSTEM

CROSS-REFERENCE TO RELATED APPLICATIONS

This application is a continuation of U.S. patent application Ser. No. 16/920,980, filed Jul. 6, 2020, which is continuation-in-part of U.S. patent application Ser. No. 15/984,421, filed May 21, 2018, entitled "Sports Training System," the contents of which are incorporated by reference in their entirety.

FIELD OF THE DISCLOSURE

The present invention relates to sports skill training, and more specifically, a sports training system for maneuvering an object such as a puck or a ball.

BACKGROUND OF THE INVENTION

It has been recognized that the skill of stickhandling greatly improves a player's ability in a hockey game. Stickhandling is using one's stick to control and maneuver the puck in ice hockey or the ball in lacrosse and field hockey. In order to improve the skill of stickhandling a player must spend significant time practicing. In the past, there have been numerous tools built to help the player practice stickhandling. However, these tools have come up short in regard to keeping the interest of the player in order to allow the player to practice enough to improve. The players also do not have ability to challenge their friends online via phone, tablet, or game console. Also, the existing tools do not have a sufficient way to analyze the players stickhandling and furthermore suggest ways to improve. Additionally, many hockey training tools are not affordable for average users to purchase.

There are several disclosures that relate to hockey and sports training. U.S. Pat. No. 8,182,373 to Delorme is for a hockey training device. U.S. Pat. No. 7,850,514 to Weber is for an interactive sports training device. U.S. Patent Pub. No. 20100137079A1 to Burke is for a method and device for sports skill training. The contents of every patent disclosed in the present application is incorporated by reference in their entireties for all purposes.

With many existing stickhandling tools, a player practices on their own and determines the pattern of the puck on their own. This method lacks the spontaneity of being challenged by different unexpected patterns. These unexpected challenges are closer to scenarios in hockey games where often times the player's moves cannot be predetermined.

Present inventions have the shortcoming of sensing the puck by using sensors on the stickhandling surface. This shortcoming means there have to be additional sensors to make the game surface larger or to have better sensing resolution which means additional cost.

Certain existing stickhandling tools have used video cameras which have reduced the need for numerous sensors on the playing surface but these systems are very costly and have the disadvantage of the puck potentially being covered by the stick or the body of the stick-handler preventing the video camera from appropriately sensing the puck and playing surface.

Numerous inventions have the disadvantage of forcing the player to look at the game floor to determine were to move the puck next. In the game of hockey it is an important skill to learn how to stickhandle with your vision primarily looking away from the ground and out in front of you in order to view the other players and surroundings. Players that are trained to look down often get body checked by other players because they do not see them coming. Furthermore, they do not pass and shoot well because they cannot focus well on the other players and playing area.

Additional shortcomings of previous stickhandling tools is lack the ability to have the game run on mobile phone or portable device that has ease of use and already built support for application to have wireless technology, for example, Bluetooth and the like, and access to the internet which allows to easily store games, challenge players, and run analysis remotely.

Another deficiency of existing stickhandling tools is lack the ability to redesign and expand the game floor. Currently, the game floors are fixed and the player cannot create different sized game floors with different areas.

Yet another deficiency is the lack of the ability to recalibrate the game sensors. The sensitivity of sensors may change over time due to dirtiness or scraping. If the sensor cannot be recalibrated the functionality can cause inaccurate readings and the user can become frustrated.

Yet another shortcoming is the lack the ability to store the stickhandling patterns in order to create your own patterns for later use or to challenge players at a later date. Players have fun when they are allowed to create their own patterns so they can master certain stickhandling moves or if they can do some especially difficult stickhandling patterns that their friends may not be able to accomplish.

There remains a continuing need for improved sports training devices in hockey and other sports.

BRIEF SUMMARY OF THE PRESENT INVENTION

While the invention can be applied to any sport that involves maneuvering an object using eye-hand coordination, reference will be made to hockey for descriptive purposes.

In accordance with one embodiment, there is a puck comprising a color sensor on the underside which allows the puck to sense the color below the puck. The underside of the puck may also have a light that shines to provide the necessary light to allow the color sensors to sense the color of the surface below the puck. The puck may also have a microprocessor and wireless transmitter to allow the puck to transmit data from the color sensor and other sensors on the puck via wireless transmission. A software application running an electronic device, such as a mobile phone or tablet, receives the sensor data and incorporates the information into a game-like or training application. This application can display to the user which color section the puck should be on for the game. This application can also analyze which stickhandling patterns the player has difficulties with and suggest certain patterns and other advice to help the player to improve their skills.

In accordance with one embodiment of the present invention, a puck is utilized to hold electronics that may be used to identify the location and other movement attributes of the puck and communicate this data back to an electronic device. Those skilled in the art will appreciate that the means for identifying location may be achieved in a variety of different manners. Additionally, the communication may be achieved in a variety of different manners. Moreover, the puck may be any movable object.

One general aspect includes user configurable system for sports training. The user configurable system includes a sports object may include at least one sensor to indicate a position of the sports object. The system also includes a surface that may have a plurality of sections that can be sensed by the sports object. The system also includes a wireless transmitter connected to the sports object, the wireless transmitter configured to transmit data gathered from the at least one sensor of the sports object to an electronic device capable of: i) receiving transmitted data from the wireless transmitter, ii) displaying sports object moving instructions to a player to position the sports object is in an appropriate position on the surface based on the data, and iv) adjusting a score of the player when the sports object is in the appropriate position in accordance to the sports object moving instructions. Data from the at least one sensor is indicative of a position of the sports object on the surface.

Another general aspect includes a user configurable system for sports training. The user configurable system includes a hockey object that has at least one color sensor to indicate a position of the hockey object. The system also includes a surface that has plurality of sections that can be sensed by the hockey object. The system also includes at least one light illumination source attached to a bottom surface of the hockey object, the at least one illumination source enabling the at least one color sensor to sense a color beneath the hockey object. The system also includes a wireless transmitter connected to the hockey object, the wireless transmitter configured to transmit data gathered from the at least one color sensor of the hockey object to an electronic device capable of: i) receiving transmitted data from the wireless transmitter, ii) displaying hockey object moving instructions to a player to position the hockey object on at least one of the plurality of sections of the surface, iii) determining whether the hockey object is in an appropriate position on the surface based on the data, and iv) adjusting a score of the player when the hockey object is in the appropriate position in accordance to the hockey object moving instructions. Data from the at least one color sensor is indicative of a position of the hockey object on the surface.

Another general aspect is for a system for sports training. The system includes a sports object having at least one of a wireless transmitter and a wireless receiver, where the sports object is adapted to be placed on a surface for playing a game. The system includes at least one base station having at least one of a wireless transmitter and a wireless receiver, where the at least one base station has electronic components configured to be in wireless communication with the sports object for calculating a distance between the sports object at the at least one base station.

DETAILED DESCRIPTION OF EMBODIMENTS

Figure 1A:
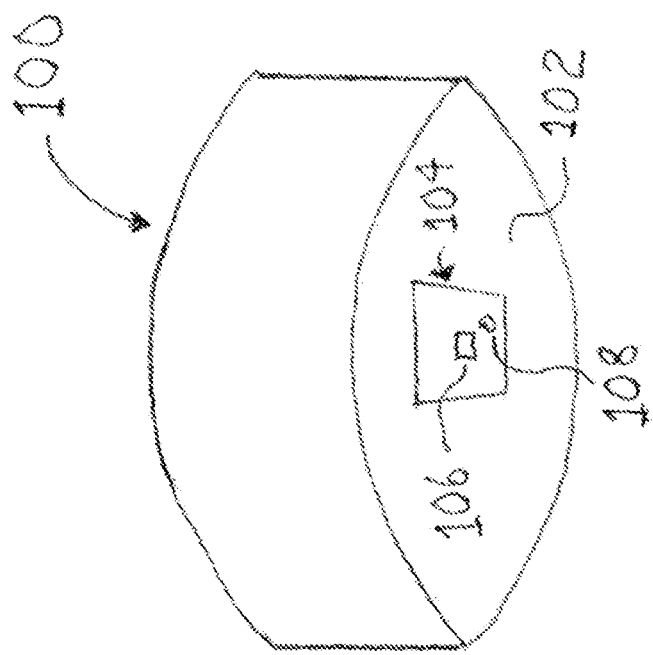
FIG. 1A illustrates a perspective view of the underside of a puck according to an embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Turning to the figures, FIG. 1A illustrates one embodiment which is shown generally as a puck 100 wherein electronics 104 are attached to the puck's underside 102 which is designed in such a way to allow room for electronics. The electronics may contain a color sensor 106 and a light source 108 that face downward. The light source 108 allows the color sensor 106 to sense the color of the surface beneath the puck. The puck's underside 102 may be a light color or reflective material to enhance the color sensing functionality. The bottom of the puck may be designed to be concave or raised in order to fit electronics and be raised enough to allow light to be sensed by the sensor. In alternate embodiments, the surface floor may be the source of light that enhances the color sensing. In alternate embodiments, the puck may be a ball or any other movable object.

Figure 1B:
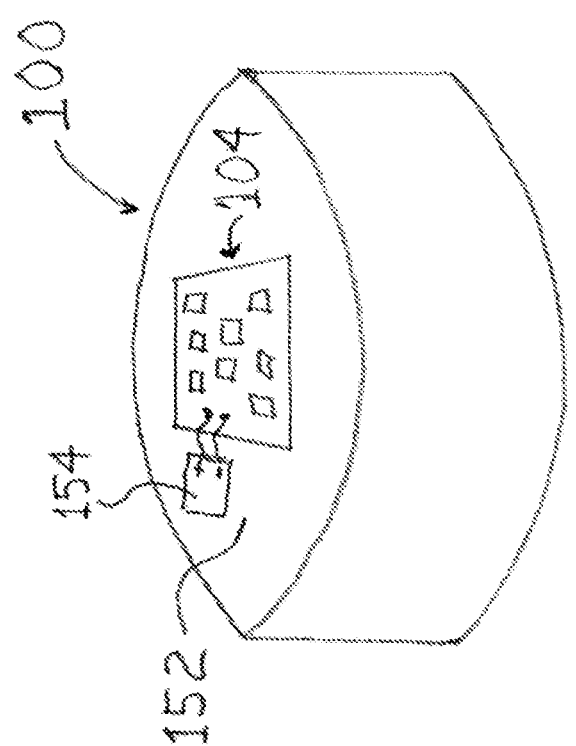
FIG. 1B illustrates a perspective view of the top side of a puck according to an embodiment of the present invention.

Referring to FIG. 1B, an embodiment in perspective view of the top side of a puck 100 as previously described in FIG. 1A. The top side of the puck 152 can be designed in such a way to allow room for electronics 104. The electronics may contain electronics to allow for wireless communication (for example, Bluetooth) to nearby devices. The puck 100 may have a battery 154 (which may be rechargeable) to power the electronics. Those skilled in the art will appreciate that the electronics of the puck may be on one to many circuit boards.

The puck 100 may be constructed in such a way that the electronics may be within a removable piece of the center of the puck to allow for easy manufacturing and replacement. The electronics may be capable of being snapped in or screwed in. The electronics may be designed so that the sensors are on both the top and bottom of the puck to allow the sensing to be independent of the orientation of the puck in case the puck flips. Those skilled in the art will appreciate that the electronics can be placed anywhere in or attached to the puck.

Figure 2:
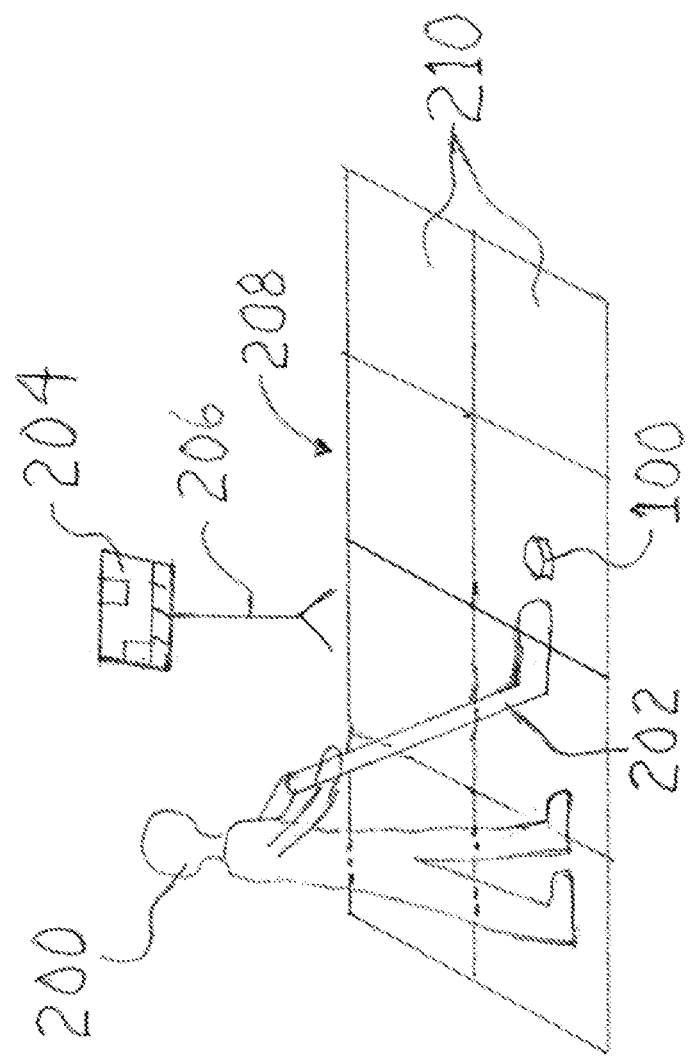
FIG. 2 illustrates an exemplary view of a game in action according to an embodiment of the present invention.

FIG. 2 illustrates a sports training system comprising the puck 100 from FIG. 1A and FIG. 1B used in a game to test the stickhandling skills of a game player 200. The game may be comprised of a multi-colored pattern on a game floor 208 which may have the colors divided into sections 210. The color sensor 106 from FIG. 1A may sense the color of the section beneath the puck 100 and transmit this information using the electronics 104 from FIG. 1A and FIG. 1B to send wireless communication (for example, Bluetooth) to a nearby electronic device 204 which may be a mobile phone, tablet, game console, or computer. The game player 200 may use a hockey stick 202 to move the puck 100 during game play. The game display may be on the electronic device 204. This device may display colors to the game player 200 that correspond to the colors of sections on the game floor 208. The user receive points for stickhandling puck to the sections 210 that are colored corresponding to the colors shown on the electronic device 204. The electronic device 204 may be held up by a stand 206 to allow the game player to more easily view the game display and allow the player to practice stickhandling while not focusing on the floor. Those skilled in the art will appreciate that the electronic device 204 may be any device with computing, display, and communication capabilities.

Figure 3:
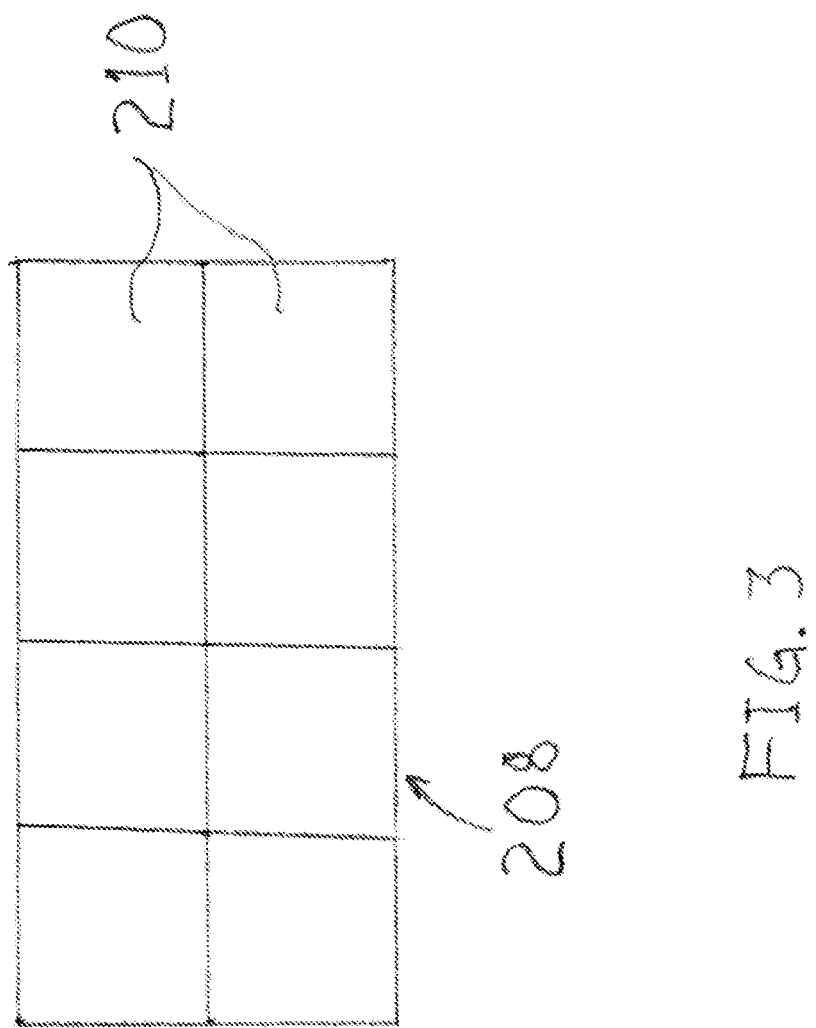
FIG. 3 illustrates a top view the game floor from FIG. 2 according to an embodiment of the present invention.

FIG. 3 illustrates a close up view the game floor 208 from FIG. 2 which is comprised of various color sections 210 which will allow the readings of the color sensor 106 of the puck 100 to indicate the approximate location of the puck. For example, if the color sensor is reading the color blue, then the puck must be on the blue section of the game floor and if the color sensor is reading the color orange then the puck must be on the orange section of the floor. The game floor may be a solid pad that has different sections of the pad in different colors. In an alternate embodiment, the game floor may be different colored tiles adhered together. The game floor may also be a translucent surface (for example, ice or acrylic) with different colored sections underneath the translucent surface that the color sensor 106 can sense through the translucent surface.

In an alternate embodiment, the game floor 208 may be a typical floor surface (for example, concreate or tile) that has different colored sections and it may be a sheet made of synthetic materials or natural materials. The sections 210 of the game floor 208 need not be equal or even linear. The number of sections on the game floor may be 2 to many. The game can be adjusted to add as many different sections as needed.

Figure 4:
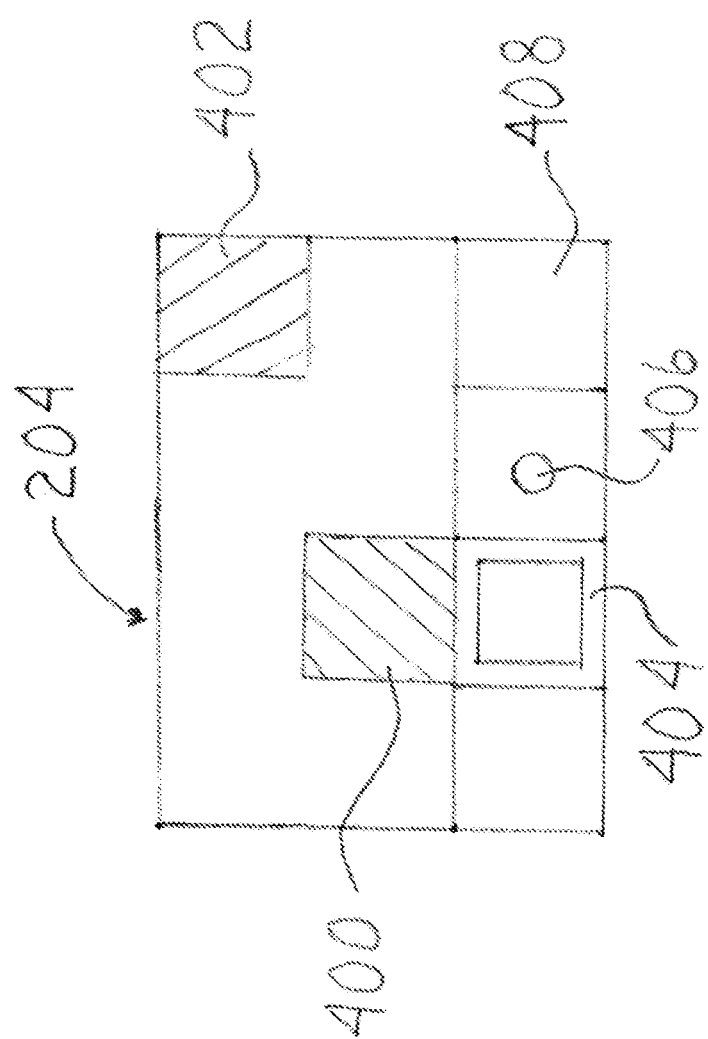
FIG. 4 illustrates a front view of a game display for a simple game according to an embodiment of the present invention.

FIG. 4 illustrates the electronic device 204 game display for a basic game. The game display shows the game player 200 which color section the puck should be on. The bottom of the screen displays colored sections that correspond to the colored sections of the game floor 208 from FIG. 3. The top portion of the game display shows preview sections that correspond to the colored sections below. These preview sections forewarn the game player of which color sections are about to become active. The preview sections fall from the top of the screen to the bottom at a varying speed depending on game difficulty level. For example, since the preview section 402 is dropping towards the bottom of the screen, the game player can predict that the section 408 is going to be active. The preview section 400 has already reached the bottom of the screen and therefore section 404 is active. The game section can be indicated as active by highlighting it differently or using a different pattern as can be seen in section 404. The game display can also indicate which section the puck 100 is currently on by displaying an indicator 406 on the corresponding section on the game display.

It should be recognized that the game could indicate that the player should have the puck 100 on one section or a plurality of sections. In the case of a plurality of sections, the player may have to move the puck back and forth across the sections to score points.

Figure 5:
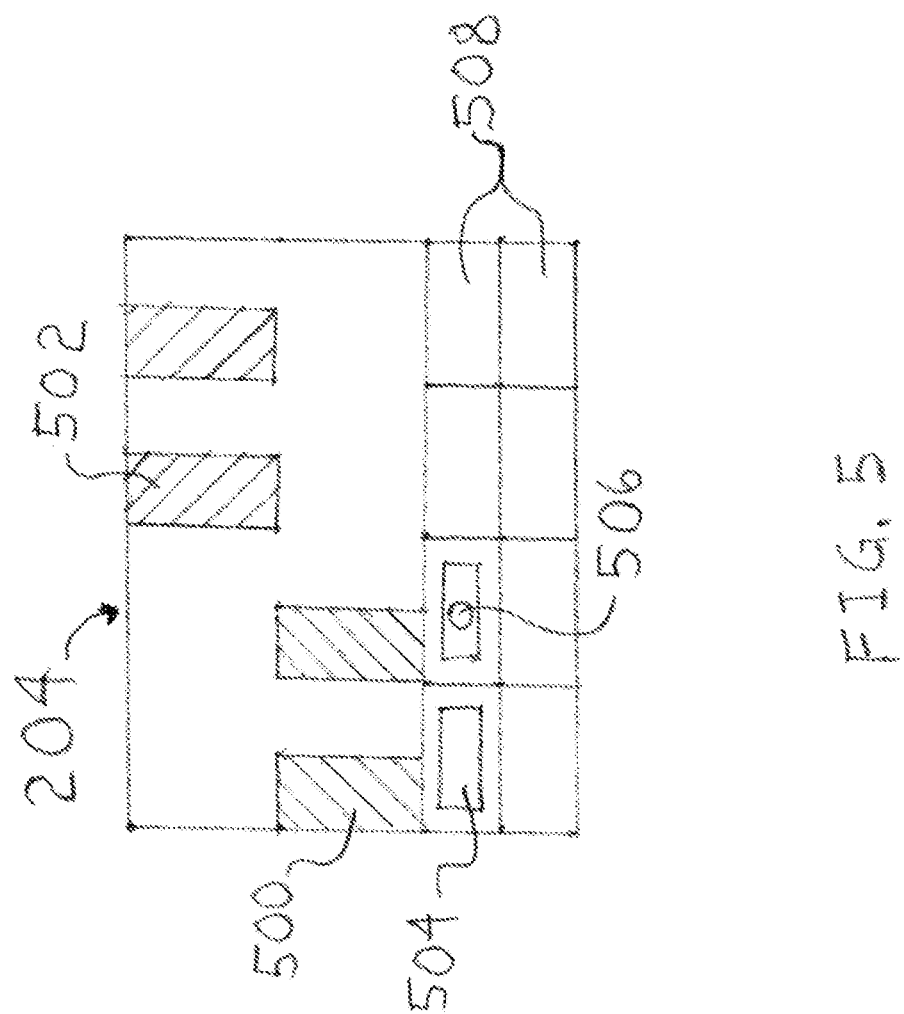
FIG. 5 illustrates a front view of a game display for an advanced game according to an embodiment of the present invention.

FIG. 5 illustrates the electronic device 204 game display for an advanced game. In this version of the game, there is a plurality of rows of sections 508 for the puck to be moved to and from. This will allow the player to work on stickhandling in all of the various directions. A preview section 500 may be within the left half of the column to indicate the top row of floor sections or a preview section 502 may be within the right half of the column to indicate the bottom row. In FIG. 5 section 504 and section 506 are highlighted as active to indicate that the player should move the puck back and forth to those corresponding sections of the game floor. Section 506 further indicates that the puck is sensed to be on this corresponding section of the game floor, wherein the game application can award the player with points.

It should be recognized by those skilled in the art that the game floor sections could expand to be as many columns and as many rows as necessary to allow for expanded game play. Also, it should be recognized that the game floor sections can be any shape or size to allow for differing game play. For example, the game floor sections can be larger for novice players where as more advanced players may have smaller floor sections with more rows and columns. Moreover, game floor sections can be non-linear to better suit stickhandling patterns. Those skilling in the art will appreciate that the game application may be setup to allow the player to expand and configure the game floor layout.

Those skilled in the art will appreciate that the game can use many other means to indicate which location the puck should move to and many other means of scoring. It should be recognized by those skilled in the art that the application on the electronic device 204 may be in the training genre and not in the gaming genre. It should be recognized by those skilled in the art that the electronic device may be a mobile phone or tablet and the game application may be a mobile phone application.

Figure 6:
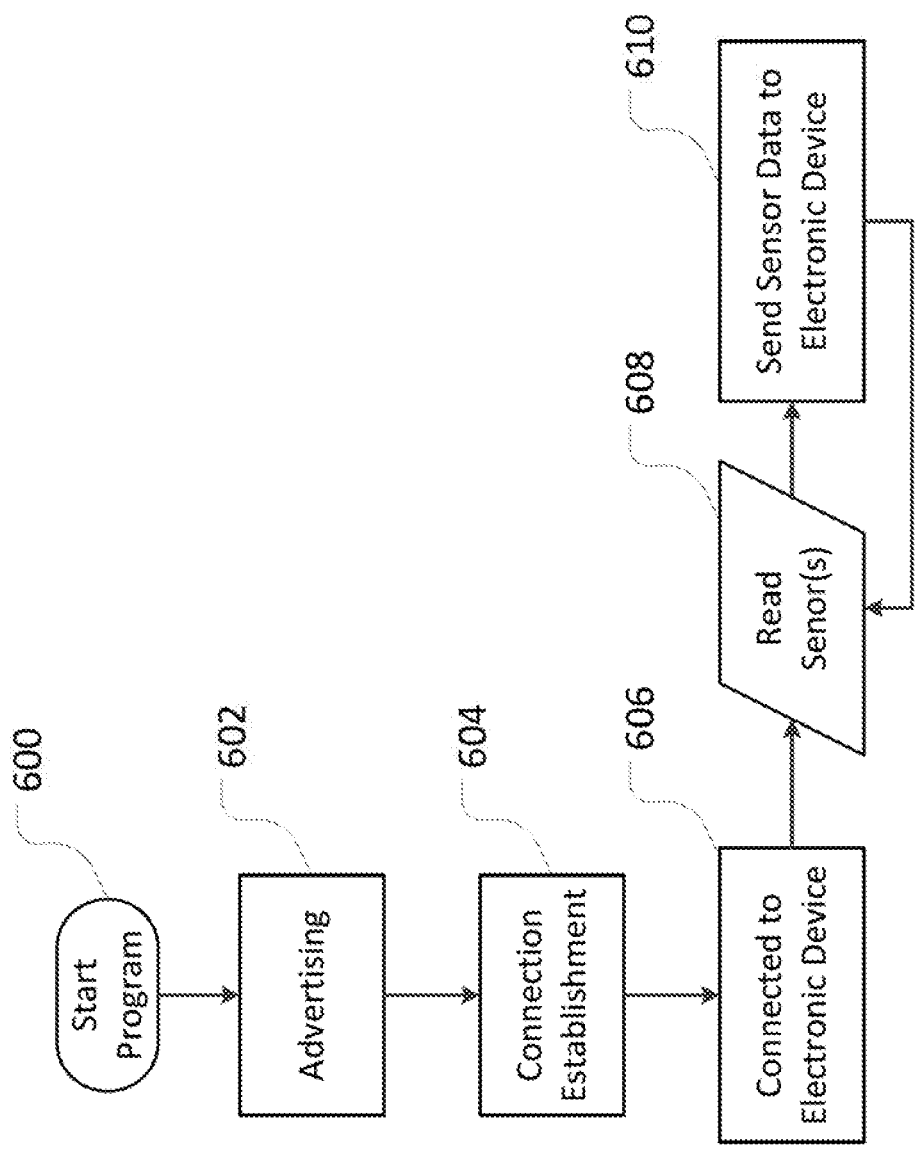
FIG. 6 illustrates a flow chart for a software application for a puck according to an embodiment of the present invention.

FIG. 6 illustrates a flowchart for an example of a software application running on the microprocessor of the puck. After the start of the application 600, the electronics on the puck 100 may use the advertising 602 feature of Bluetooth. The connection establishment process 604 is started and the electronic device may be connected 606 to electronics 104 on the puck 100. Next, the sensor data is read 608 from the sensors on the puck 100. After the sensor data is read, the data is transmitted 610 to the electronic device. The steps of reading 608 and transmitting 610 the sensor data may be repeated in a continuous loop.

Figure 7:
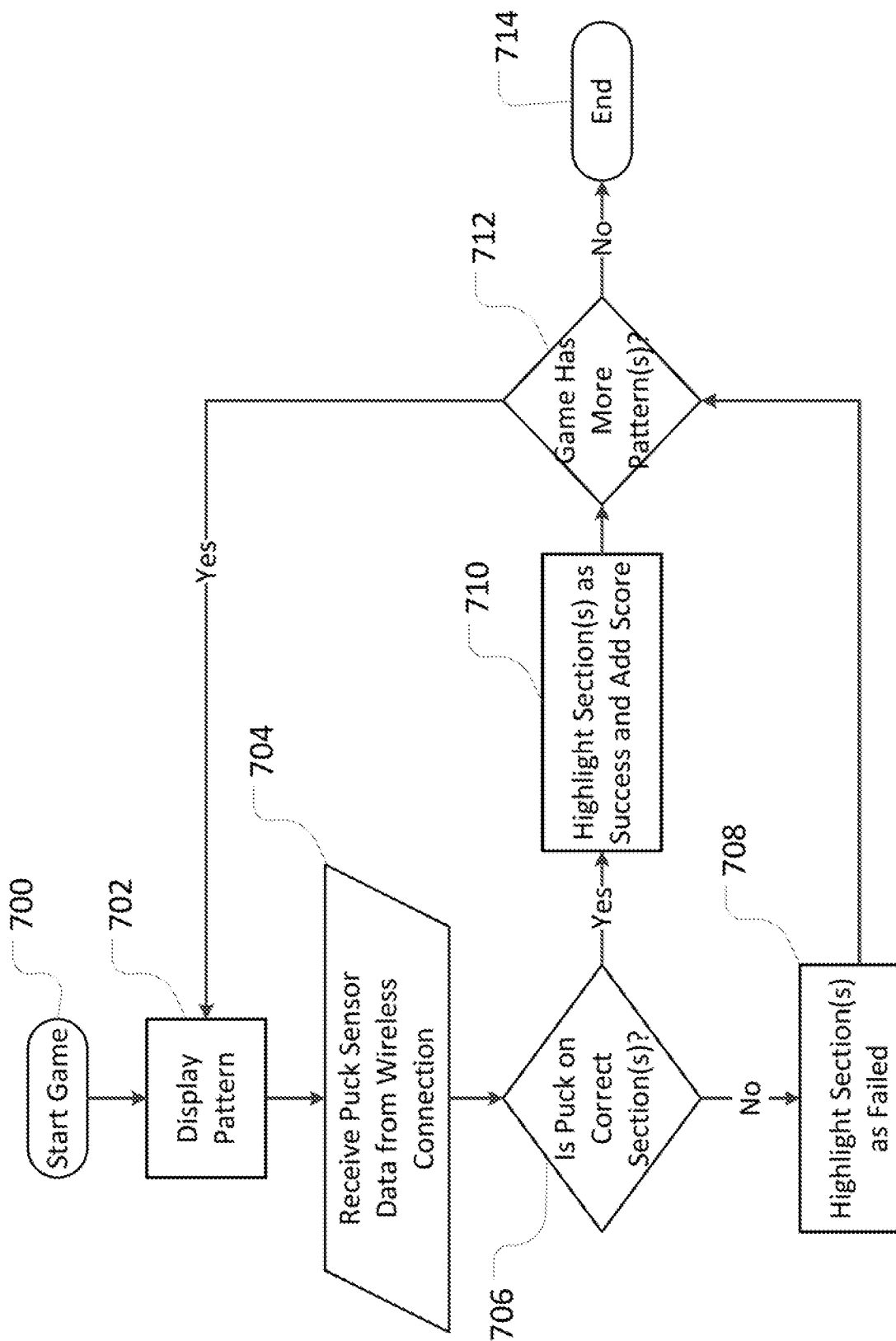
FIG. 7 illustrates a flow chart for a software application for an electronic device according to an embodiment of the present invention.

FIG. 7 illustrates a flowchart for the basics of a game. The game may be a software application on the electronic device. For example, the game may be mobile phone application. The game starts 700 and the application may display a pattern 702 with instructions of where the player should move the puck. The pattern may be one to many sections. For example, if the pattern is just a blue section, then the player must move the puck to the blue section to get points. If the pattern contains a yellow section and green section, then the player must move the puck back and forth between the yellow and green sections. The application then receives the color sensor data 704 that is being sent to the electronic device 204 from the electronics 104 on the puck 100 to determine the location of the puck 100. The application will then decide 706 if the puck 100 was on the appropriate location. If the puck 100 was not on the appropriate location 708, the application will alert the user by displaying the section as failed. If the application was on the appropriate location 710 the application will display the section as successful and adjust the scoring appropriately. The application will determine if there are more patters in the game 712 and continue in the loop until there are more patterns for the game. The game will end 714 after the last pattern.

Those skilled in the art will appreciate that this is one example of an application; there are many other alternate applications that may use different interfaces and different game play.

It should be recognized by those skilled in the art that the sensor data from the puck 100 may go directly to electronic device 204 or communicate to an intermediate device. It should be recognized by those skilled in the art that the electronics 104 on the puck 100 may send additional data other than sensor data, for example, timing data.

The electronics 104 of the puck 100 in FIG. 1A and FIG. 1B may contain an accelerometer to measure the tilt of the puck 100. The tilt of the puck may be used in calculating the color sensing to compensate for the color sensor being further away from the floor section and the color sensor being exposed to extra ambient light. The accelerometer may also be used to indicate if the puck has been flipped to the other side to then allow the electronics to read from the alternate color sensor on the other side or to allow the game to pause until the puck is flipped back over. The accelerometer can also be used to measure the speed of the puck which can be used in game play to assist in the scoring or other calculations.

Those skilling in the art will appreciate that color sensors and accelerometers are just a couple of types of sensors that can be used to analyze object movement.

Figure 8:
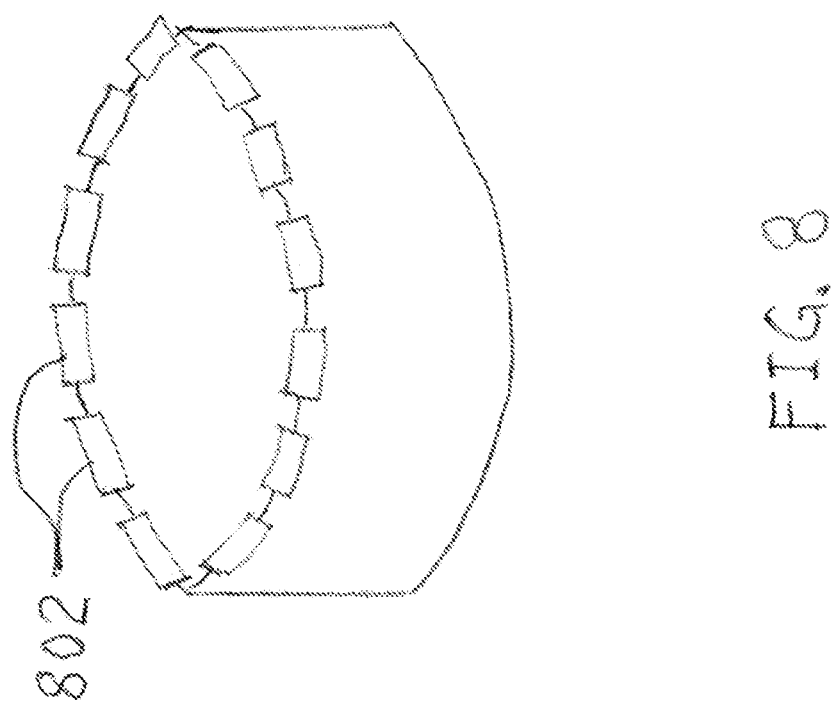
FIG. 8 illustrates a top perspective view of a puck with rollers on the top edge to avoid the puck from being flipped while stickhandling.

FIG. 8 illustrates a puck designed with rollers 802 along the top edge of the puck to prevent the stick blade from grabbing the edge and flipping the puck over. It should be recognized by those skilled in the art that the puck may be designed with various other mechanisms to prevent the puck from be flipped by the stick blade, for example, embedded ball bearings could be used on one or both edges to prevent the stick blade from gripping and flipping the puck.

All of the data from the sensors on the puck 100 may be sent via wireless transmission to the electronic device 204. This data may be analyzed for the scoring of the game but also may be used for overall puck movement analysis. The system can recognize if a player needs help in certain stickhandling moves and the system can add certain stickhandling patterns into the game in order to help the player have extra practice with those patterns. For example, if the system analyzes data to determine that the game player has problems moving the puck downward and then to the right, the system can add more of those moves in the game routine for additional practice or the system may avoid those moves to make it easier. The accelerometer can also be used to indicate that the puck is tilting a lot and that the player needs to "cup" the puck more to keep the puck flat.

The puck 100 can be made so that the electronics 104 are waterproof in order to use the puck on the ice. The puck 100 can be made in a manner that will protect the electronics 104.

The application on the electronic device 204 may compensate for a lag time for the transmission of the data from the puck electronics to the electronic device 204. This may be helpful if there is any lag time while using wireless transmission such as Bluetooth.

The puck 100 may be moved around the floor sections in order to calibrate the color sensing of the section and have improved identification of the color of the floor sections that may not have consistent colors or may have colors that may have faded. For example, a blue section of the surface may fade over time to a lighter blue. The puck 100 may be moved around to various locations on the blue section of the game surface so that the color sensor data is sent wirelessly to the electronic device and the application on the electronic device can use this sensor data to calibrate the color sensor data range to more accurately identify the blue section of the game surface.

Game patterns may be set as either for right handed or left handed. Game patterns may be altered if an opposite handed player wants to play the pattern. For example, to create a similar game pattern for a right handed player moving down and to the right, the pattern may be changed to down and to the left for a left handed player.

The game can record new stickhandling patterns by using the puck 100 with the color sensor 106 to sense the color of the sections the puck is moved over and the application on the electronic device can record the pattern. For example, the player can choose the put the application in record mode and the game may use the sensor data and timing data to record the stickhandling patterns so that the patterns can be saved and played later.

The game can also record new stickhandling patterns by using a touch screen (or any other input method) on the electronic device 204. A user can use their finger to record new patterns by doing the pattern on the electronic device touch screen that represents the sections on the floor for the pattern and the timing data for the pattern.

In an alternate embodiment there may be a plurality of pucks on the floor. The electronics of the pucks may send sensor data to one to many different electronic devices to be used by one to many applications on the electronic devices. The pucks may be moved by one to many players.

In an alternate embodiment there may be a plurality of surfaces being used with a plurality of pucks that may send sensor data to one to many different electronic devices to be used by one to many applications on the electronic devices.

The applications on the electronic devices may communicate directly to the other electronic devices or connect indirectly to send and receive data to be used by the application. For example, multiple players may challenge each other on different surfaces using different pucks and different electronic devices. Those skilled in the art will appreciate the various combinations of setups for multi-player games.

The electronic device can be connected to the internet so that players can play against other players live via the internet. Players can also post their patterns online and challenge other players. A high score list can be posted for all of the different patterns.

In an alternate embodiment, the player may move the sensing devices with their hands or feet in order to achieve the same results as stickhandling. It should be recognized that the game surface does not have to be a floor; it could be vertical like a wall or a surface at any other angle. For example, the system may be used for soccer training and the player may move a ball with their feet.

In yet another embodiment, the sensors may be on the bottom of shoes that the player wears and the player must move the shoes to different sections of the surface for the application of the game or training tool.

Game patterns may be setup to use obstacles or other stickhandling tools on the playing surface. For example, a pattern can indicate that the game surface should have a bridge obstacle between the 3rd and 4th floor section. The player may be responsible for placing the obstacle on the location that the pattern indicates. This will allow for the creation of more advanced and creative stickhandling patterns.

The patterns can also indicate a puck passing tool be used as part of the playing surface. For example, a puck passing tool can be clamped to the left edge of the playing surface and the game pattern can suggest when to use the puck pass tool. This also allows for the creation of more advanced and creative stickhandling patterns.

In an alternate embodiment, the player may move the puck to avoid the sections on the electronic device display in order to score points.

The game display can indicate where the player should stand during the stickhandling game pattern. This will allow the game surface to be used in different ways and allow for more flexibility of different stickhandling patterns. The game screen can also indicate which way the user should be facing. Patterns may also contain rest sessions to allow the player to rest during long patterns.

The game patterns may also use audio to indicate the floor section the puck should be on or any other important information. The patterns may be played with background music to make the patterns easier to remember with audio linkage.

The application may store all of the data for the user in order to analyze all of the data for statistical purposes or for coaching reasons. This data may be analyzed locally on the electronic device or sent to a remote server to be analyzed. The overall data from all users may also be analyzed to determine overall statistical patterns.

The game display may show the player a brief video tutorial of a certain move that the game analyzed that the player was having difficulty accomplishing. For example, if during the game played, the game analyzed that the user was scoring low using a "hockey toe drag" (a toe drag is a move that the player pulls the puck with the toe of the stick blade), the game application could give the user a tip or show the player a video of how to improve with "hockey toe drags".

The game can use voice activation in order to allow game setup and restart without having to manually interact with the electronic device. Also, the player can move the puck to control the setup of a game. For example, the player can move the puck back and forth between red and yellow in order to restart game or go back and forth between blue and white in order to go into game mode select.

In an alternate embodiment, proximity sensors may be used to identify the location of the puck 100. In an alternate embodiment, GPS (Global Positioning System) sensors may be used to identify the location of the puck 100.

In yet another embodiment, the puck 100 may use sensors to read patterns on the floor to identify the location of the puck 100. For example, barcode or QR code technology may be on the floor 208 and the puck 100 may read the codes and send the information back to the electronic device 204 to identify the location of the puck.

Those skilled in the art will appreciate that all of the sections of the game floor need not be unique to identify the location of the puck. For example, there may be 2 blue sections of the game floor. One blue section may have adjacent tiles that are red, green, and yellow; while the other blue section may have adjacent tiles that are black, white, and grey. Therefore, if the previously sensed color was red (before sensing blue), the software application can identify the section as being the first blue section listed above.

Figure 9:
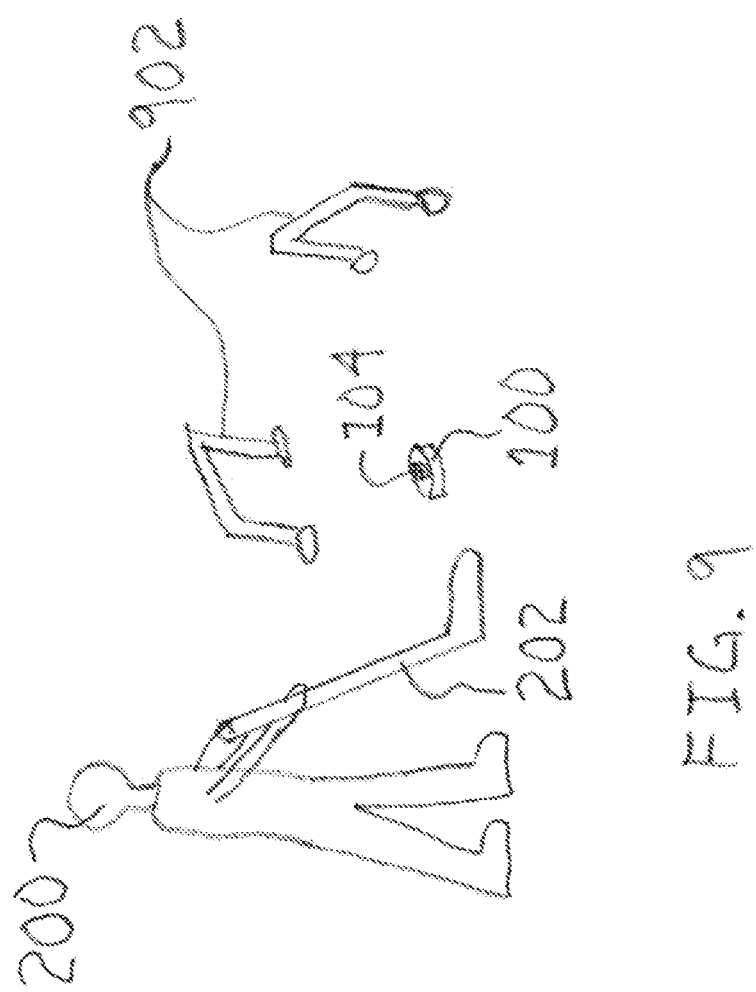
FIG. 9 illustrates an exemplary view of game that uses distance sensing technology to have the player keep the puck away from stickhandling obstacles.

FIG. 9 illustrates a game setup using robotic obstacles (or obstacle members) 902 on the playing surface whereby the player 200 uses the stick 202 to move the puck 100 to avoid the robotic obstacles. The puck 100 may have transmitter that allows the robotic obstacles 902 to identify the location of the puck 100. The robotic obstacles 902, which can be self-moving robotic obstacle members, may then move towards the puck which makes the stickhandling difficult for the player and allows the player 200 to practice keeping the puck away from defenders. The player 200 may be awarded extra points for moving the puck 100 under any bridge-like robotic obstacles 902. The purpose of the obstacles or robotic obstacle members is that these obstacles can mimic real-world players or other obstacles on a game surface so that a user can practice sports object maneuvering in a more real-world game setting compared to practicing sports object maneuvering without obstacle members.

Figure 10:
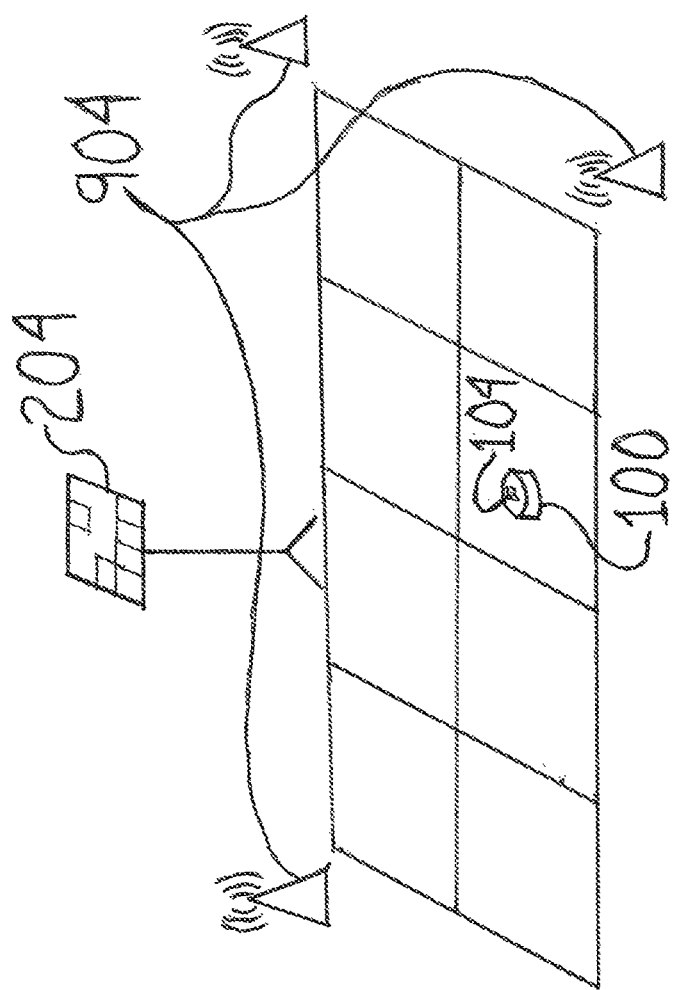
FIG. 10 illustrates an exemplary view of a game that uses distance sensing technology to identify approximate location of the sports object.

FIG. 10 illustrates another embodiment which the location of the puck 100 may be identified using wireless technology (for example, ultra-wideband) to approximate distances between the puck 100 and the base stations 904. Ultra-wideband is be a type of wireless technology useful for the present embodiments because it allows for precise tracking of objects. Ultra-wideband technology is disclosed at least in U.S. Pat. No. 7,671,802 to Walsh et al, for tracking players and sports objects, and is incorporated by reference in its entirety for all purposes. Wireless technology, including ultra-wideband, can be used to triangulate positions relative to each other of sports objects, players, obstacles and/or any other object in communication with transmitters and receivers used to detect the presence of one or more objects.

The electronics 104 of the hockey puck may have a wireless transmitter and a wireless receiver and the base stations may also have electronics that may contain wireless transmitters and wireless receivers to allow for wireless communication which may be used to measure distance between the objects. Time of flight method may be used to determine the distance between the two objects using wireless communication. Time of flight method is one of many methods that may be used to determine the distance between the two objects. Three to many base stations may be used for triangulation methods to calculate the approximate location of the puck. The distance information may be sent wirelessly to an electronic device 204 for calculation or the calculation may be done by the electronics of the puck or base stations. It should be recognized by those skilled in the art that the electronic device 204 may be used as a base station. It should be recognized by those skilled in the art that location identification may use many other methods, such as using wireless signal angle of arrival and angle of departure to calculate location. It should be recognized by those skilled in the art that less than three base stations may be used to calculate location or the base stations may not be needed at all. The base station may be a smart phone that is also capable of displaying the game. It should be recognized by those skilled in the art not all objects need both a wireless transmitter and a wireless receiver some may have only a wireless transmitter or a wireless receiver. In alternate embodiments, the puck may be a ball or any other movable object.

Figure 12:
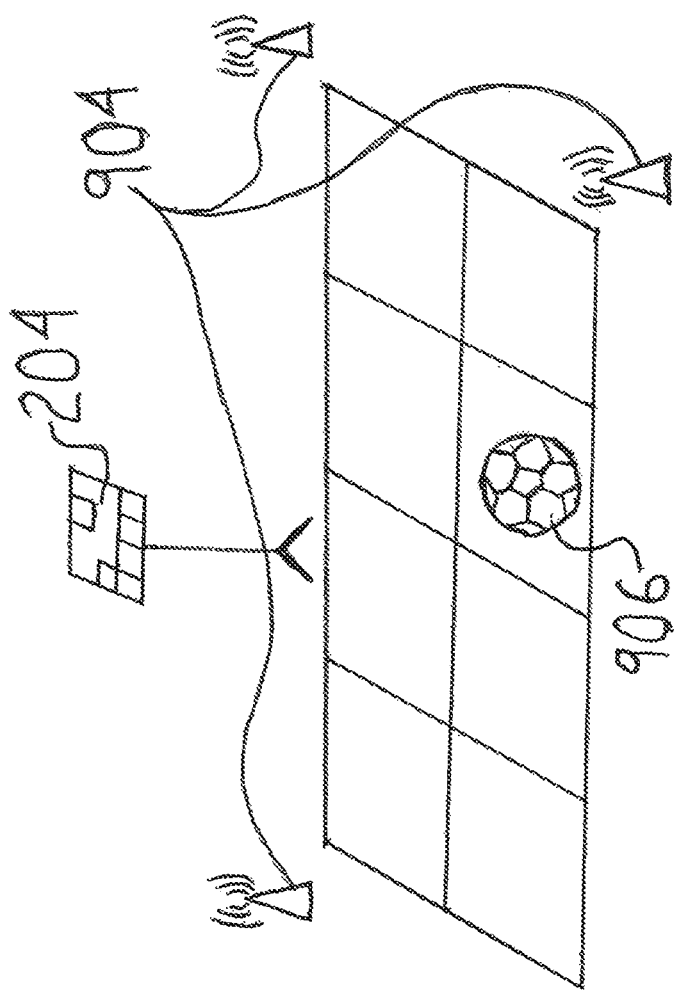
FIG. 12 illustrates an exemplary view of a game that uses distance sensing technology to identify approximate location of the sports object.
Figure 14:
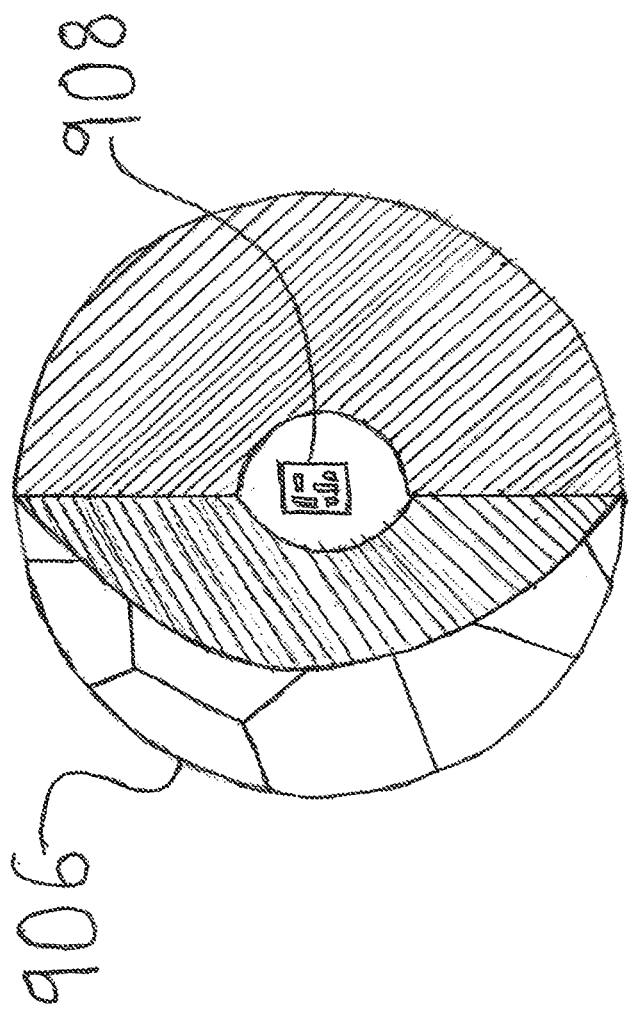
FIG. 14 illustrates a cross-sectional view of a soccer ball according to an embodiment of the present invention having electronics embedded within the soccer ball.

FIG. 12 illustrates another embodiment (similar to FIG. 10) where the location of a soccer ball 906 may be identified using wireless technology (for example, ultra-wideband) to approximate distances between the soccer ball 906 and the base stations 904. In some embodiments, there may be a single base station and in other embodiments there may be a plurality of base stations, where at least one of the base stations can be used for calculating the distance between the sports object (e.g. soccer ball or hockey puck) and the base station and relative positions between any of the objects used in the system. FIG. 14 illustrates a cross-sectional view of a soccer ball 906 comprising foam and a compartment inside that allows for storage of electronics 908. The electronics may contain a wireless transmitter and a wireless receiver. The electronics may also contain other sensors (for example, an accelerometer) along with a microprocessor and a battery. It should be recognized by those skilled in the art that the electronics may be attached to the soccer ball in many other ways, including, but not limited to either on the inside or outside of the soccer ball.

Figure 11:
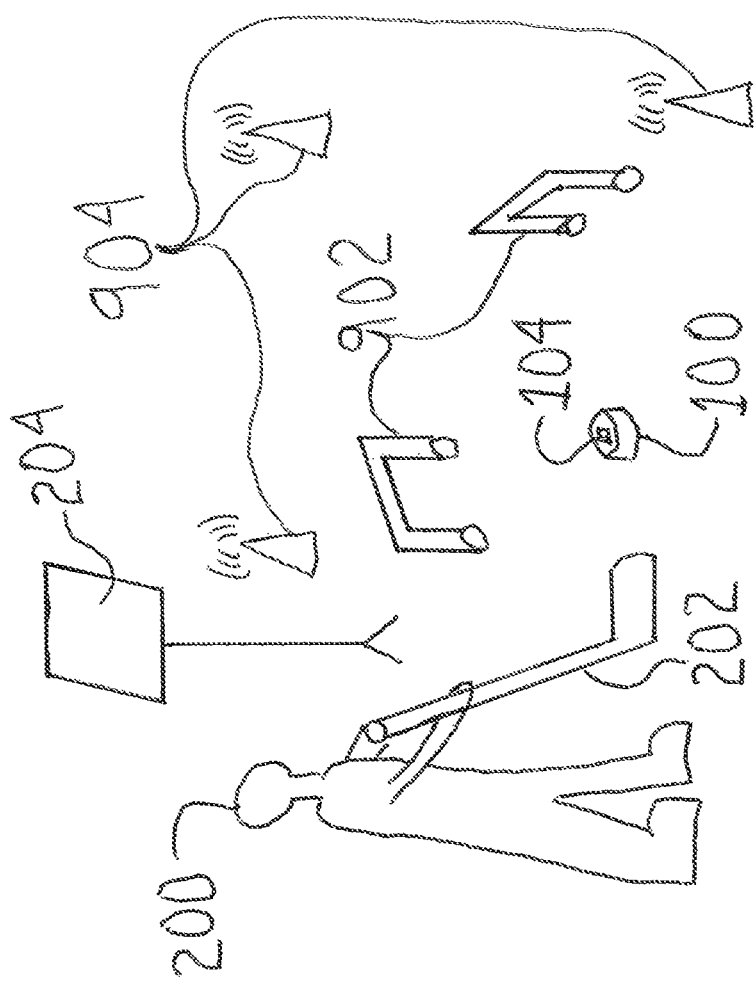
FIG. 11 illustrates an exemplary view of a game that has a player avoid obstacles with a sports object that uses distance sensing technology to identify approximate location of the sports object and approximate location of robotic obstacles.

FIG. 11 illustrates a game setup using one to many robotic obstacles 902 on a playing surface whereby the player 200 uses the stick 202 to move the puck 100 to avoid the robotic obstacles 902. The location of the puck 100 and the robotic obstacles 902 may be identified using wireless technology (for example, ultra-wideband) to approximate distances between the puck 100 and the robotic obstacles 902 and the base stations 904. The puck, the robotic obstacles, and the base stations may all have electronics that may contain wireless transmitters and wireless receivers to allow for wireless communication used to measure distance between the objects. Time of flight method may be used to determine the distance between the two objects using wireless communication. Time of flight method is one of many methods that may be used to determine the distance between the two objects. Three to many base stations may be used for triangulation methods to calculate the approximate location of the puck and robotic obstacles. The distance information may be sent wirelessly to an electronic device 204 for calculation or the calculation may be done by the electronics of the puck, robotic obstacles, or base stations. It should be recognized by those skilled in the art that the electronic device 204 may be used as a base station. It should be recognized by those skilled in the art that location identification may use many other methods, such as using wireless signal angle of arrival and angle of departure to calculate location. It should be recognized by those skilled in the art that fewer than three base stations may be used to calculate location or the base stations may not be needed at all. The location information of the puck and robotic obstacles may be utilized to move the robotic obstacles toward the puck. The robotic obstacles may react differently to the puck's location depending on the game mode. Additional sensors (for example, an accelerometer) may be used in the puck to further assist in the location of the puck. It should be recognized by those skilled in the art not all objects need both wireless transmitters and wireless receivers some may have only wireless transmitters or wireless receivers. It should be recognized by those skilled in the art that the electronic device 204 may not be needed for the game. In alternate embodiments, the puck may be a ball or any other movable object. The predictive back and forth of the puck during stickhandling (or a soccer ball during dribbling) may be used to approximately identify the current and future location of the object. In alternate embodiments, one to many of the obstacles may not be robotic. The electronic device 204 may be used for a game to keep track of how long the player is able to keep the puck a certain distance away from the obstacles. The electronic device 204 may be used to keep track of how many times the player can move the puck into certain zones to score points while still avoiding the obstacles. It should be recognized by those skilled in the art that many other games and training exercises may be implemented with this embodiment.

Figure 13:
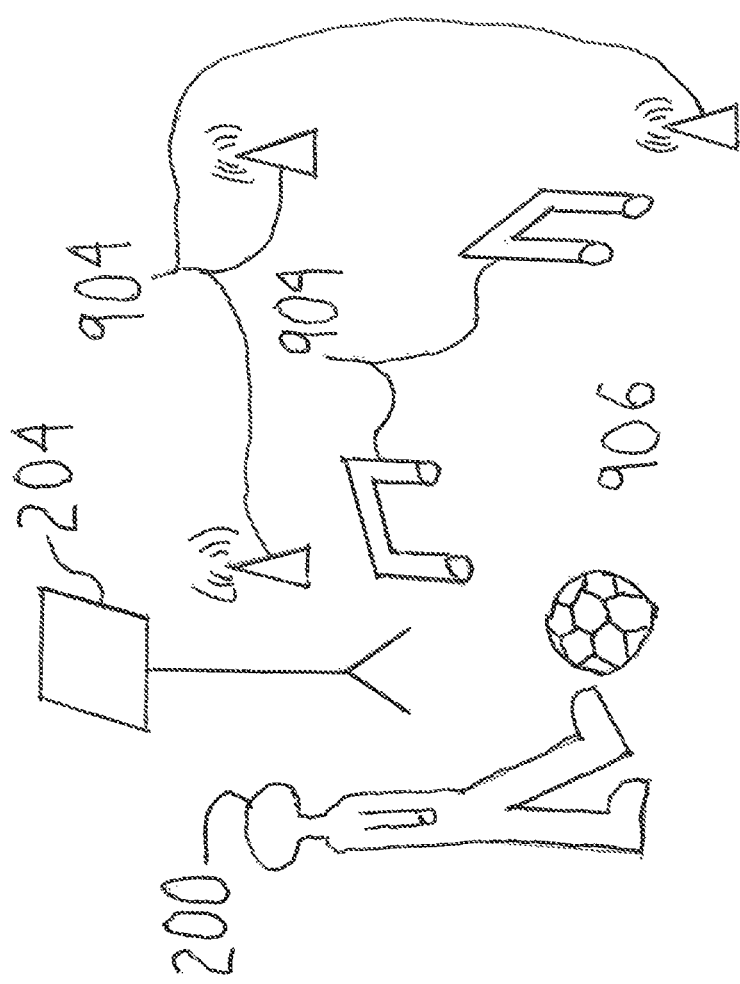
FIG. 13 illustrates an exemplary view of a game that has a player avoid obstacles with a sports object that uses distance sensing technology to identify approximate location of the sports object and approximate location of robotic obstacles.

FIG. 13 illustrates a game setup (similar to FIG. 11) using one to many robotic obstacles 902 on a playing surface whereby the player 200 moves the soccer ball 906 to avoid the robotic obstacles. The soccer ball may be made of foam containing a compartment inside that allows for storage of electronics 908. The electronics may contain a wireless transmitter and a wireless receiver. The electronics may also contain other sensors (for example, an accelerometer) along with a microprocessor and a battery. It should be recognized by those skilled in the art that the electronics may be attached to the soccer ball in many other ways, including, but not limited to, either on the inside of the soccer ball (i.e. embedded) or outside of the soccer ball.

The application on the electronic device 204 may display an indicator to suggest what type of move to execute. For example, the application may suggest the puck should be moved from the blue section to the orange section using a "backhand hockey toe drag" instead of a "standard hockey toe drag."

In an alternate embodiment, the sensors may also be located at the top of the puck to sense light from above to indicate the position of the puck for the game. In this embodiment the light may move and the player must keep the puck either under (or possibly away from) the light.

The setup of using color sensors to identify the location of the object is not limited to a sports training device. This setup can also be used for various other applications.

In an alternate embodiment, the puck 100 may contain all of the logic and electronics for the game. The puck may have a light on top of the puck that shows a color (or a plurality of colors) of the section of the floor and the player must move the puck in order to score points. The puck may also have a display or speaker to indicate score and other information regarding the game.

Any of the systems described above may also include a CPU (not pictured), which is adapted to receive data from a sports object, one or more base stations, and is adapted to calculate distances and/or relative positions between one, two or more of the sports object, obstacle members, and base stations. The CPU may be embedded or in electronic communication with any number of parts of the system, including the electronic display, sports, object, base station, or obstacles.

The elements listed in any of the described Figures above may be combined in whole or in part with other elements of other Figures without detracting from the spirit of the present invention.

The various embodiments which have been described above are exemplary and should in no way be considered in any way limiting as to the scope of the present invention.

It will be apparent to one with skill in the art that the sports training system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. A system for sports training comprising:
   a) a playing surface configured for conducting sports training;
   b) at least one base station having:
      i) an ultra-wideband communication module configured to transmit and/or receive signals used for position determination using UWB communication;
   c) a sports object, wherein the sports object is one of a hockey puck or a soccer ball, the sports object having
      i) an ultra-wideband communication module configured to transmit and/or receive signals used for position determination using UWB communication;
      ii) wherein the sports object is configured to be placed on the playing surface for use during gameplay;
      iii) electronic circuitry configured to establish wireless communication with the at least one base station;
      iv) electronic circuitry configured to enable calculation of distance between the sports object and the at least one base station based on received signals;
   d) a robotic obstacle member having a motorized mechanism configured to autonomously move on the playing surface without direct human intervention, the robotic obstacle member having:
      i) an ultra-wideband communication module configured to transmit and/or receive signals used for position determination using UWB communication;
      ii) wherein the robotic obstacle member is configured to be placed on the playing surface for using during gameplay;
      iii) electronic circuitry configured to establish wireless communication with the at least one base station;
      iv) electronic circuitry configured to enable calculation of distance between the robotic obstacle member and the at least one base station based on received signals; and
   e) an electronic device configured to execute a software application, the electronic device having a processor, and configured to:
      i) receive sensor and signal data from the sports object, the at least one robotic obstacle member and the at least one base station;
      ii) determine real-time positions of the sports object and the robotic obstacle member on the playing surface using UWB communication combined with time-of-flight (ToF) measurements to triangulate positions in real-time;
      iii) calculate distances between at least two of: the sports object, the robotic obstacle member, and the base station;
      iv) generate moving instructions for the at least one robotic obstacle member based on real-time positions;
      v) calculate scoring metrics for a player based on at least one of sports object position, completion time, and spatial interactions with the at least one robotic obstacle member; and
      vi) output training instructions to a user interface comprising at least one of: a visual display and an audio feedback output.

2. The system of claim 1, wherein the robotic obstacle member continuously and dynamically adjusts its movement pattern in real-time in response to real-time position data of the sports object received via the electronic device.

3. The system of claim 1, wherein the electronic device generates predictive movement instructions for the robotic obstacle member based on historical trajectory data indicating predicted future locations of the sports object.

4. The system of claim 1, wherein the robotic obstacle member alters its behavior in response to a selectable game mode, wherein the behavior is responsive to real time positions of the sports object.

5. The system for sports training of claim 1, wherein the at least one base station embodied within is a smart phone capable of displaying a game.

6. The system for sports training of claim 1, further comprising an accelerometer connected to the sports object.

7. The system for sports training of claim 1, wherein the robotic obstacle member mimics real-world players or other obstacles on the playing surface for playing the game so that a user can practice sports object maneuvering in a more real-world game setting compared to practicing sports object maneuvering without obstacle members.

8. The system for sports training of claim 1, wherein the ultra-wideband communication module the sports object is embedded within the sports object.

* * * * *